US011525945B2

(12) United States Patent
Yoo et al.

(10) Patent No.: US 11,525,945 B2
(45) Date of Patent: Dec. 13, 2022

(54) SYSTEM AND METHOD FOR ABLATION ASSISTED NANOSTRUCTURE FORMATION FOR GRADED INDEX SURFACES FOR OPTICS

(71) Applicant: Lawrence Livermore National Security, LLC, Livermore, CA (US)

(72) Inventors: Jae Hyuck Yoo, Dublin, CA (US); Eyal Feigenbaum, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 190 days.

(21) Appl. No.: 16/016,105

(22) Filed: Jun. 22, 2018

(65) Prior Publication Data

US 2019/0391298 A1    Dec. 26, 2019

(51) Int. Cl.
*G02B 1/12* (2006.01)
*B23K 26/352* (2014.01)

(52) U.S. Cl.
CPC ............ *G02B 1/12* (2013.01); *B23K 26/3584* (2018.08)

(58) Field of Classification Search
CPC .......... G02B 1/10; G02B 1/043; G02B 1/041; G02B 1/11; G02B 1/115; G02B 1/105; G02B 1/113; G02B 1/118; G02B 1/12; G02B 1/02; G02B 5/285; G02B 5/0816; G02B 5/0242; G02B 5/0268; G02B 5/0263; G02B 5/206; G02B 5/0221; G02B 5/0284; G02B 5/0294; G02B 5/08; G02B 5/0858; G02B 5/008; G02B 5/021; G02B 5/18; G02B 5/1814; G02B 5/1847; G02B 5/1857; G02B 5/32; G02B 27/0172;

(Continued)

(56) References Cited

U.S. PATENT DOCUMENTS

2008/0081207 A1    4/2008  Ohsaki et al.
2008/0118760 A1    5/2008  Kaiser et al.
(Continued)

FOREIGN PATENT DOCUMENTS

CN      103332868 B      1/2016
JP      S62207721 A      9/1987
WO    WO-2006096255 A2   9/2006

OTHER PUBLICATIONS

N. Haustrup and G.M. O'Connor "Impact of wavelength dependent thermo-elastic laser ablation mechanism on the generation of nanoparticles from thin gold films" Applied Physics Letters 101, 263107 (2012) (Year: 2012).*

(Continued)

*Primary Examiner* — Chris Q Liu
(74) *Attorney, Agent, or Firm* — Harness, Dickey & Pierce, P.L.C.

(57) ABSTRACT

A system and method is disclosed for forming a graded index (GRIN) on a substrate. In one implementation the method may involve applying a metal layer to the substrate. A fluence profile of optical energy applied to the metal layer may be controlled to substantially ablate the metal layer to create a vaporized metal layer. The fluence profile may be further controlled to control a size of metal nanoparticles created from the vaporized metal layer as the vaporized metal layer condenses and forms metal nanoparticles, the metal nanoparticles being deposited back on the substrate to form a GRIN surface on the substrate.

18 Claims, 6 Drawing Sheets

(58) Field of Classification Search
CPC ........ G02B 27/1073; G02B 2027/0109; G02B 6/132; G02B 6/34; B81C 2201/0181; B81C 2201/0132; B81C 2201/0197; B81C 2201/0125; B81C 2201/0107; B81C 2201/0121; B81C 2201/0133; B81C 2201/0119; B81C 2201/0143; B81C 2201/0188; B81C 1/00126; B81C 1/00531; B81C 1/00936; B81C 1/00373; B81C 1/00158; B81C 1/00246; B81C 1/0038; B81C 1/00476; B81C 1/00182; B81C 1/0019; B81C 2203/0136; B81B 3/0021; B81B 2203/0127; B81B 2207/09; B81B 3/0072; B81B 2201/047; B81B 7/02; B81B 2201/045; B81B 3/0081; B01L 2300/0896; B82Y 40/00; B82Y 10/00; B82Y 30/00; H01L 29/456; H01L 21/02211; H01L 21/02271; H01L 21/02266; H01L 21/02381; H01L 21/02532; H01L 21/02631

See application file for complete search history.

(56) References Cited

U.S. PATENT DOCUMENTS

| | | | |
|---|---|---|---|
| 2009/0218519 A1* | 9/2009 | McLeod | G03F 7/70416 250/492.1 |
| 2014/0009834 A1 | 1/2014 | Kalyankar | |
| 2014/0072720 A1* | 3/2014 | Watkins | H01M 8/124 427/487 |
| 2015/0107582 A1 | 4/2015 | Jin et al. | |
| 2015/0177426 A1 | 6/2015 | Sakoske et al. | |
| 2019/0091950 A1* | 3/2019 | Hernandez Rueda | B29C 59/022 |
| 2020/0024465 A1 | 1/2020 | Dylla-Spears et al. | |

OTHER PUBLICATIONS

Pinaki Das Gupta and G.M. O'Connor "Comparison of ablation mechanisms at low fluence for ultrashort and short-pulse laser exposure of very thin molybdenum films on glass" Applied Optics, vol. 55, Issue 9 (Year: 2016).*

Unknown Brochure from Amplitudes Systemes (Year: 2012).*

International Search Report and Written Opinion of International Application No. PCT/US2019/034328, dated Sep. 20, 2019.

Ullmann, M., Friedlander, S.K. and Schmidt-Ott, A., 2002. Nanoparticle formation by laser ablation. Journal of Nanoparticle Research, 4(6), pp. 499-509.

Haustrup, N. and O'Connor, G.M., 2011. Nanoparticle generation during laser ablation and laser-induced liquefaction. Physics Procedia, 12, pp. 46-53.

Dudukovic, N.A., Wong, L.L., Nguyen, D.T., Destino, J.F., Yee, T.D., Ryerson, F.J., Suratwala, T., Duoss, E.B. and Dylla-Spears, R., 2018. Predicting nanoparticle suspension viscoelasticity for multimaterial 3D printing of silica-titania glass. *ACS Applied Nano Materials*, 1(8), pp. 4038-4044.

Dylla-Spears, R., Yee, T.D., Sasan, K., Nguyen, D.T., Dudukovic, N.A., Ortega, J.M., Johnson, M.A., Herrera, O.D., Ryerson, F.J. and Wong, L.L., 2020. 3D printed gradient index glass optics. *Science advances*, 6(47), p.eabc7429.

Miller, A., Yu, L, Blickensderfer, J. and Akolkar, R., 2015. Electrochemical copper metallization of glass substrates mediated by solution-phase deposition of adhesion-promoting layers. *Journal of The Electrochemical Society*, 762(14), p. D630.

Extended European Search Report regarding Application No. 19821970.1 dated Feb. 9, 2022.

Ye Chunfang: "Three-dimensional Gradient Index Optics Fabricated in Diffusive Photopolymers", Apr. 1, 2012 (Apr. 1, 2012), XP055878665, Retrieved from the Internet: URLzhttps://www.proquest.com/docview/1283376354?accountid=294045parentSessionId=90JexbwiOyMu7Rd8uVRPsgnEj91nOQF11kv15%3DEparentSessionId=atHr2nUSE6ZFi2EltTM9BNIrDUfRN2TcM8Fmwf4%3D&pq-origsite=summon [retrieved on Jan. 13, 2022].

* cited by examiner

SYSTEM AND METHOD FOR ABLATION ASSISTED NANOSTRUCTURE FORMATION FOR GRADED INDEX SURFACES FOR OPTICS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for forming spatially varying refractive index on a substrate, and more particularly to systems and methods for forming graded index (GRIN) refractive surfaces on substrates by spatially controlling a fluence profile of optical energy to ablate a metal layer and to redeposit nanoparticles from the metal layer in a controlled pattern to form a GRIN surface.

BACKGROUND

This section provides background information related to the present disclosure which is not necessarily prior art.

Large optics fabrication techniques are key enablers of lightweight space applications and high power laser system applications. With both of these applications, the power is usually carried by large aperture beams to reduce the intensity. For both fields, technologies that have the flexibility to allow for freeform optics and complex alternating optics, such as gratings, are desirable. A few examples of useful freeform operations are optics for general aberrations corrections (e.g., optics for correcting high order aberration for traditionally built lenses), contour phase plates (CPP) for inertial confinement fusion (ICF) laser systems, and combining optical functions for light-wave systems.

The existing technologies for large-scale optics with freeform flexibility are diamond turning polishing and Magnetorheological Finishing (MRF). The diamond turning polishing technique provides limited surface quality with respect to optical grade. In addition, its laser damage resilience is relatively low. Accordingly, without further surface treatment, this technique can alter the surface morphology of a surface.

MRF can produce a high quality surface but is time consuming to perform. Furthermore, the resulting maximal modulation of the optical function is limited by its small removal function.

Both the diamond turning polishing method and the MRF method have access to the surface figure, but not to modifying the refractive index of the surface layer. Modification of the refractive index enables even more optical functionalities. For instance, a uniform random nanostructured substrate can be used to replace the traditional antireflection (AR) coating layer for high power laser systems with a proven, high laser-induced damage threshold. This nanostructured AR layer replaces a traditional AR coating by introducing effectively the same refractive index, functioning as a meta-surface. The light wave is insensitive to the specific features due to their subwavelength lateral scale, but instead reacts to the net averaged refractive index. These nanostructured AR layers can be fabricated using Reactive Ion Etching (RIE) resulting in a surface with a random roughness, and with subwavelength features as TelAztec LLC of Burlington, Mass. has demonstrated. However, the mask-less approach has no access to spatial shaping, which is critical to have true freeform flexibility. Yet, it is challenging to manufacture masks with nano-sized features on a large scale.

SUMMARY

This section provides a general summary of the disclosure, and is not a comprehensive disclosure of its full scope or all of its features.

In one aspect the present disclosure relates to a method for forming a graded index (GRIN) on a substrate. The method may comprise applying a metal layer to the substrate and controlling a fluence profile of optical energy applied to the metal layer to substantially ablate the metal layer to create a vaporized metal layer. The method may also comprise further controlling the fluence profile of the optical energy to control a size of metal nanoparticles created from the vaporized metal layer as the vaporized metal layer condenses and forms metal nanoparticles, with the metal nanoparticles being deposited back on the substrate to form a GRIN surface on the substrate.

In another aspect the present disclosure relates to a method for forming a graded index (GRIN) on a substrate having a metal layer. The method may comprise controlling a fluence profile of a laser beam generated by the laser to substantially ablate the metal layer to create a vaporized metal layer. The method may further include controlling the fluence profile of the laser beam to control a size of metal nanoparticles created from the vaporized metal layer as the vaporized metal layer condenses and forms metal nanoparticles. The method may further include controlling the fluence profile of the laser beam such that the metal nanoparticles are created in different sizes, and further controlling the fluence profile of the laser beam such that the metal nanoparticles are patterned in a predetermined manner on the substrate as the metal nanoparticles are deposited back on the substrate, to form a GRIN surface on the substrate.

In still another aspect the present disclosure relates to a system for forming a graded index (GRIN) on a substrate. The system may comprise an optical energy generating system which generates optical energy in the form of a beam having a controlled fluence profile. The optical energy generating system may be configured to be controlled to control the fluence profile of the beam to initiate melting of the metal layer to substantially ablate the metal layer, and to create a vaporized metal layer. The fluence profile of the beam may further be controlled so as to control a size of metal nanoparticles created from the vaporized metal layer as the vaporized metal layer condenses and forms metal nanoparticles, with the metal nanoparticles being deposited back on the substrate to form a GRIN surface on the substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems and methods for efficiently producing masks having nano-sized features, which are well suited for forming freeform optics and masks for the above mentioned applications. By utilizing the metal nanostructures as a mask for etching substrates, the nanostructures can be directly projected to substrates. The present disclosure, which involves efficiently fabricating the mask by an ablation process, provides the potential for new applications where the cost efficient manufacture of graded-index optics has been a limiting factor.

Figure 1:
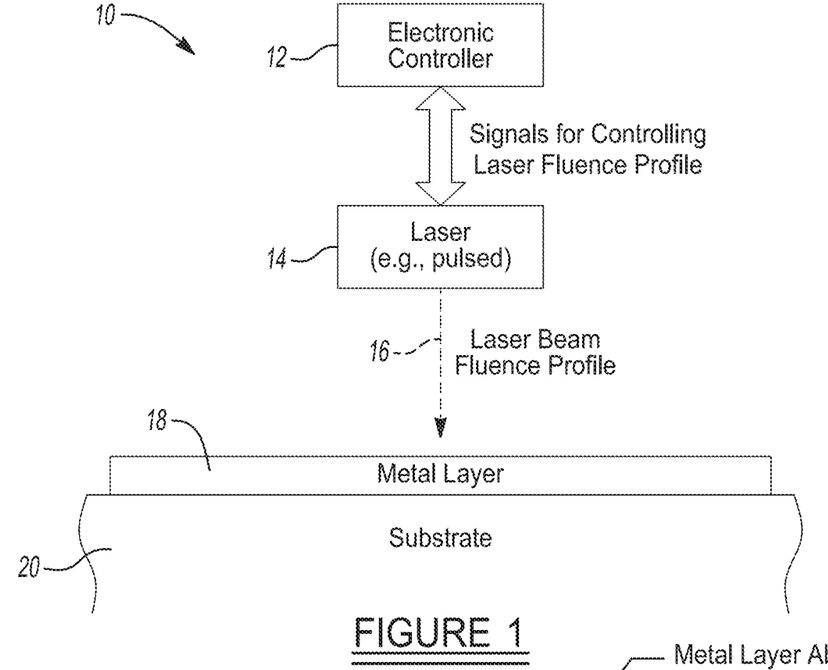
FIG. 1 is a high level block diagram of major components that may be used in forming a system in accordance with the present disclosure.

Referring to FIG. 1, a high level block diagram is shown of a system 10 in accordance with the present disclosure. The system 10 may use an electronic controller 12 to control operation of an optical energy supplying device or subsystem 14. In this example the optical energy supplying subsystem is a laser, and for convenience this component will be referred to throughout the following text as a "laser" 14. The laser 14, which may be, for example, a pulsed laser or even by a short light pulse. It will be appreciated that while use of the laser 14 may be preferred, short light pulses by flash lamps can also initiate metal film ablation (i.e., with suitable optics and/or beam delivery). This would create metal vapor and result in nanoparticles in the same manner as described in the following paragraphs when using the laser 14. For simplicity, however, the following discussion will focus on using the laser 14 to produce the optical energy needed to ablate a metal surface.

The laser 14 generates a laser beam 16 having a controlled fluence profile which is directed toward a thin metal layer 18 on a substrate 20. The term "fluence profile" includes both the power and spatial shape of the laser beam 16. The thin metal layer may be, for example, gold (Au), platinum (Pt), chrome (Cr), or titanium (Ti), and the system 10 is not limited to use with only one specific type of metal. The thickness of the thin metal layer 18 may be on the order of, for example, 10 nm-200 nm, and during testing of the system 10 a 20 nm thick film layer was used. Furthermore, the thickness may vary depending on the specific type of metal being used, and the system 10 is not limited to use with metal layers of any particular thickness. During testing of the system 10 the substrate 20 was a fused silica substrate. The wavelength and irradiation fluence of the laser beam 16 may also vary significantly, but in one example the wavelength may be 1064 nm, and the irradiation fluence may be typically between about 0.1 $J/cm^2$-1.0 $J/cm^2$. It will be appreciated that metal films are absorptive throughout UV-VIR-NIR wavelengths, for which the ablation threshold fluence of typical metals is ~0.1 $J/cm^2$. Therefore, the fluence range selected will preferably be greater than about 0.1 $J/cm^2$. Thicker film will typically require higher fluence to initiate complete ablation. The laser 14 may generate ultrashort duration pulses in the nanosecond, picosecond or femtosecond ranges. During testing of the system 10, 7 nanosecond pulses were used with a laser fluence of 0.28 $J/cm^2$ to about 0.3 $J/cm^2$.

Figure 2:
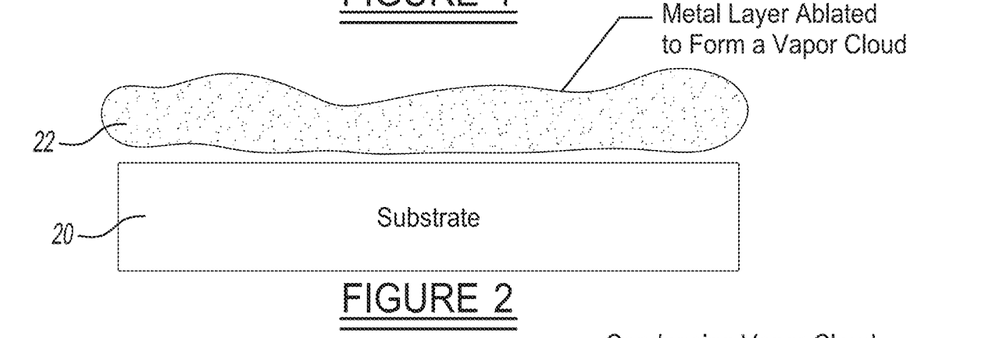
FIG. 2 is a simplified diagram illustrating how, as the metal layer on the substrate of FIG. 1 is heated using ultra short duration laser pulses, the metal layer is substantially or fully ablated, producing an expanding hot metal vapor cloud.
Figure 3:
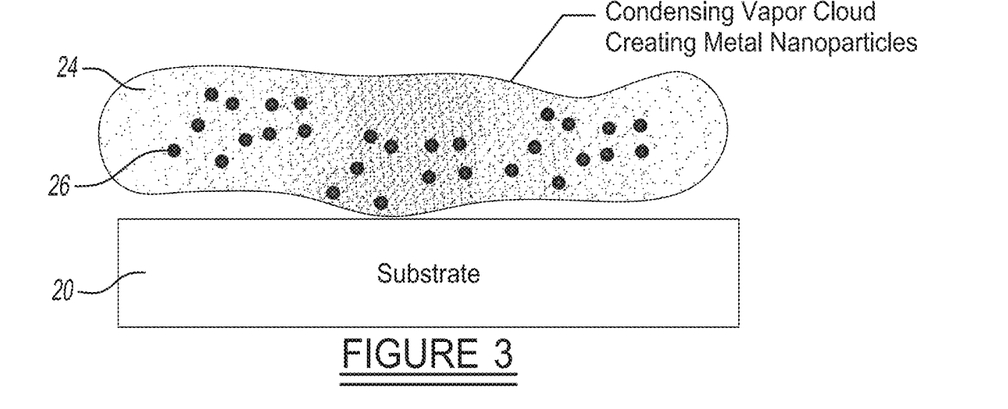
FIG. 3 is a simplified diagram showing how, as the vapor cloud of FIG. 2 condenses, it creates metal nanoparticles.
Figure 4:
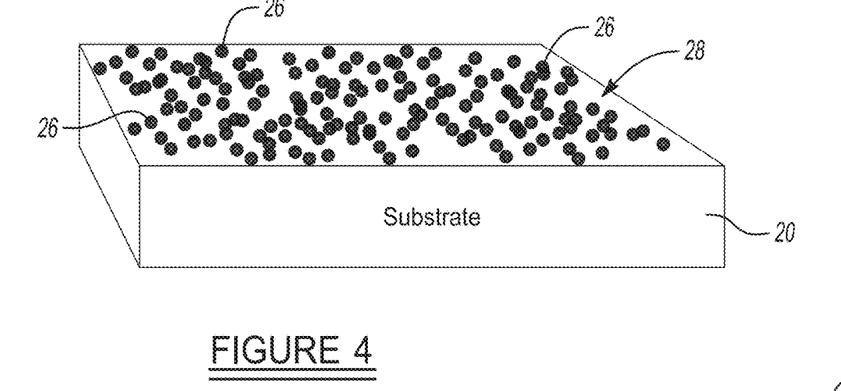
FIG. 4 shows how the metal nanoparticles have been controllably spatially patterned as they settle on upper surface of the substrate.
Figures 4A, 5:
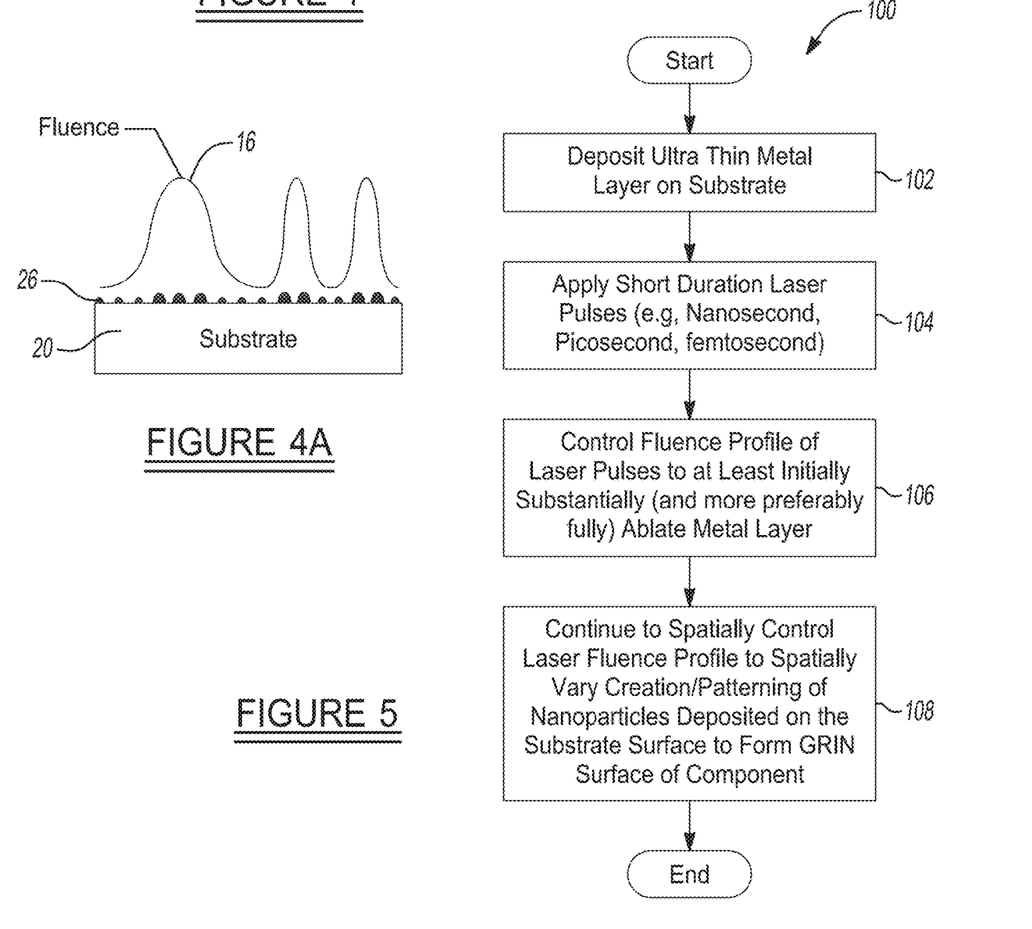
FIG. 4A shows another simplified illustration as to how the fluence of the laser beam can be controlled to influence the partial sizes and spatial distribution of the nanoparticles formed on a substrate.
FIG. 5 is a high level flowchart of a method in accordance with the present disclosure setting forth various operations that may be performed by the method in using ablation of a metal layer to produce a GRIN surface on a substrate.

As shown in FIG. 2, as the laser beam 16 irradiates the metal layer 18, the metal layer is vaporized to form a vapor cloud 22. In FIG. 3, as the vapor cloud condenses it forms a cloud 24 of metal nanoparticles 26. As will be explained further below, the exact size of the metal nanoparticles and their distribution/concentration is controlled by controlling the fluence profile of the laser beam 16. As shown in FIGS. 4 and 4A, the metal nanoparticles 26 have been deposited on an upper surface of the substrate 20 and collectively form a graded index (GRIN) surface 28. Together, the substrate 20 and its newly formed GRIN surface 28 may comprise a free form optic, an aspherical optic or reflective/refractive element. Size and location controlled metal nanoparticles can also be used for plasmonic sensors or displays.

The system 10 and its method of operation can be used to design a GRIN phase plate which enables "designer-at-will" free form optical elements to be constructed. In addition, the systems and methods disclosed herein are well suited to forming large optics, as they are based on scalable techniques that can be tailored to the specific component being manufactured.

Referring to FIG. 5, a flowchart 100 is shown of one example of a method of forming a GRIN surface on a component in accordance with the present disclosure. Initially at operation 102 a metal layer, for example an ultrathin metal layer or metal film on the order of about a few-tens of nanometers, such as layer 18 in FIG. 1, may be deposited on or applied to a substrate (e.g., substrate 20 in FIG. 1). The metal layer 18 may be applied in any suitable manner, for example by physical vapor deposition ("PVD") systems such as e-beam, thermal evaporators or sputters. The laser 14 may then be used to apply short duration laser pulses 16 (i.e., in the nanosecond, picosecond, femtosecond range) to the ultrathin metal layer, as indicated at operation 104. At operation 106 the fluence profile of the laser pulses 16 is controlled to shape the beam 16 and to initiate the ablation of the ultrathin metal layer 18. Upon pulsed-laser irradiation at selected fluence ranges and wavelengths, the entire metal layer 18 may be fully ablated. However, in some very limited instances, it may be preferred to only ablate a portion of the metal layer 18, such as if the metal nanoparticles are being deposited on a different component besides the substrate 20. Both implementations are envisioned for the present disclosure. Keeping the metal layer 18 (e.g., film) thickness on the order of laser absorption depth plus heat diffusion length ensures that the entire metal layer 18 will be removed during the initial irradiation with the laser pulses 16.

This ablation assisted nanoparticle formation is driven by local fluence of the laser pulses 16 absorbed in the metal layer 18. The metal layer 18 is vaporized as it is ablated. As the resulting vaporized cloud condenses, the metal nanoparticles 26 are formed. At operation 108 the laser fluence distribution provided by the laser pulses 16 continues to be controlled to spatially vary the size and patterning of the metal nanoparticles 16 that are created and deposited on the substrate 20. The patterned deposition of the nanoparticles 26 forms the GRIN surface 28 on the substrate 20 of the component. It will also be appreciated that the above description for operation 108 represents just one way to make a large area GRIN, surface either by beam rastering or sample translation. Alternatively, a large area GRIN surface can also be made by a single shot of fluence of a spatially modulated, large diameter beam.

Therefore, the various embodiments of the system 10 and method described herein operate to spatially control the laser fluence distribution (i.e., laser beam shaping), to achieve patterned and size-controlled metal nanostructures which can be directly deposited on the substrate on demand, and be used as an etching mask. This enables fabrication of GRIN surfaces on a wide variety of components, for example to create freeform optic devices as well as traditional optics (e.g., lens). In addition, by utilizing the metal nanoparticles as nanostructures to essentially act as an "etching" mask for etching substrates, the nanostructures can be directly projected to the substrates (e.g., fused silica). Under substrate etching conditions, metal is intact and any exposed substrate area not covered by the nanostructures is selectively etched.

Figure 6A:
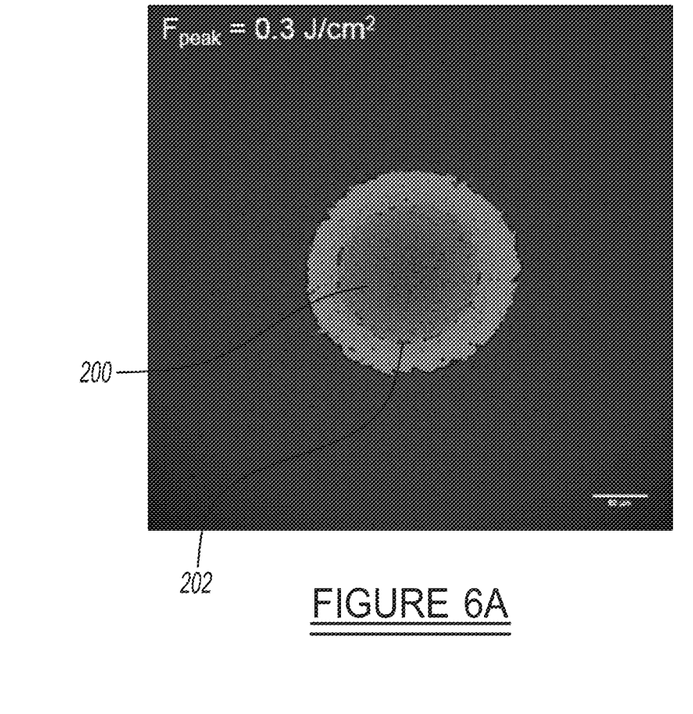
FIGS. 6A and 6B show illustrations of transmission micrographs with a 50 um scale bar showing the resulting morphology after single pulse irradiation at peak laser fluences of 0.3 J/cm2 and 0.4 J/cm2, where the visible transmission color indicates formation of sub-wavelength metal structures.
Figure 6B:
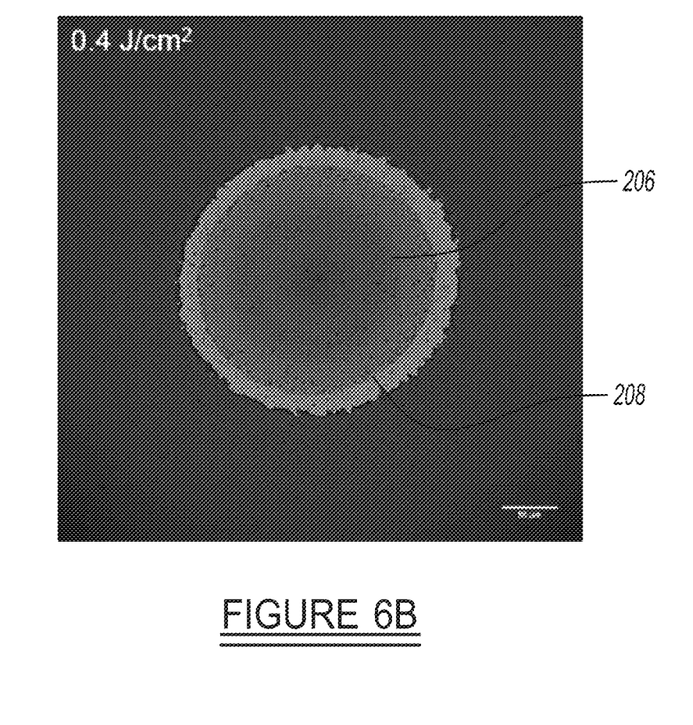

Nanoparticle formation by this method has been confirmed by capturing microstructures using scanning electron microscopy (SEM). For a 1064 nm wavelength beam, the metal layer may be a thin gold (Au) film with a thickness of ~20 nm. For experimental purposes, an e-beam evaporated 20 nm Au film on a fused silica substrate was irradiated by a 1064 nm, 7 ns laser pulse under ambient conditions. Upon nanosecond pulse irradiation at fluences of greater than 0.3 $J/cm^2$, the metal layer was fully ablated, yet the ablated metal vapor was redeposited on the substrate. This is shown in the transmission micrographs of FIGS. 6A and 1B which have a 50 um scale bar. FIG. 6A shows the resulting morphology after single pulse irradiation at a peak laser fluence of 0.3 J/cm2, and FIG. 6B at a laser fluence of 0.4 $J/cm^2$. At 0.3 $J/cm^2$ (FIG. 6A), a bluish transmission color 200 is observed in a center area 202. This visible transmission color indicates the formation of sub-wavelength metal structures. By increasing the fluence to 0.4 $J/cm^2$, as indicated in FIG. 6B, a reddish transmission color 206 is added in the center 208, indicating that different sized nanoparticles were formed.

Figure 7:
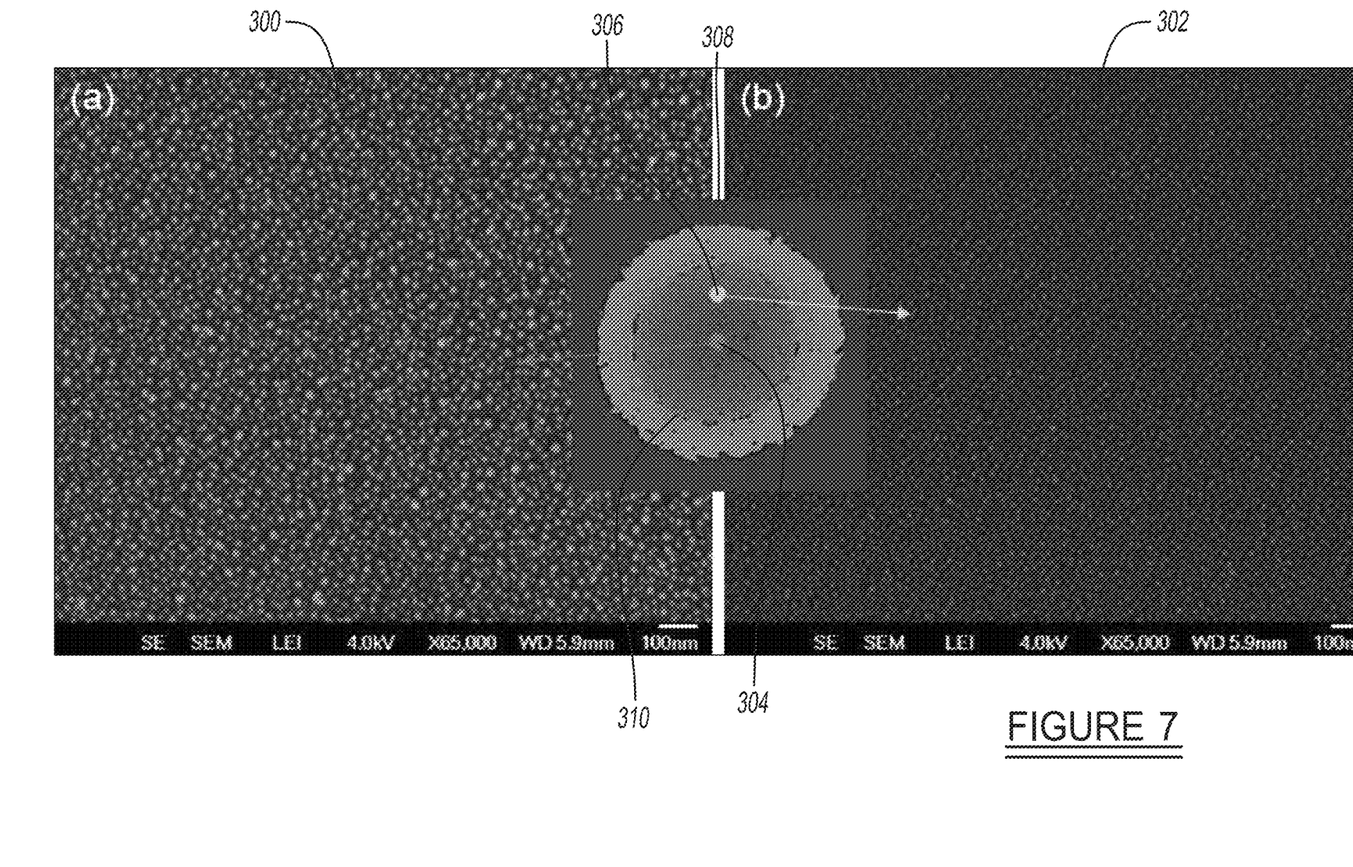
FIG. 7 shows micrograph images obtained using a scanning electron microscope (SEM) of two regions of a surface, along with a central inset figure, where the insert figure is marked with different color dots to illustrate how the nanoparticle size changes in different regions in response to a local fluence change in the applied laser beam.

Referring to FIG. 7, statistical data of nanoparticle size distribution show that particle size can be controlled by local fluence of the laser beam. Highly enlarged SEM images of two regions 300 and 302 are shown that correspond to different portions of an inset image 308. The region 300 is an enlargement of the area represented by the dot 304 in the inset image 308. The region 302 is an enlargement of the area represented by the dot 306 in the inset image 308. From these SEM images, nanoparticle size statistics were obtained. Within the center labelled 310 in the inset image 308, where the local fluence is 0.3 $J/cm^2$, approximately 15 nm nanoparticles were formed. In the region 30 um apart from the center, where the local fluence is 0.28 $J/cm^2$, approximately 5 nm nanoparticles were formed.

Figure 8:
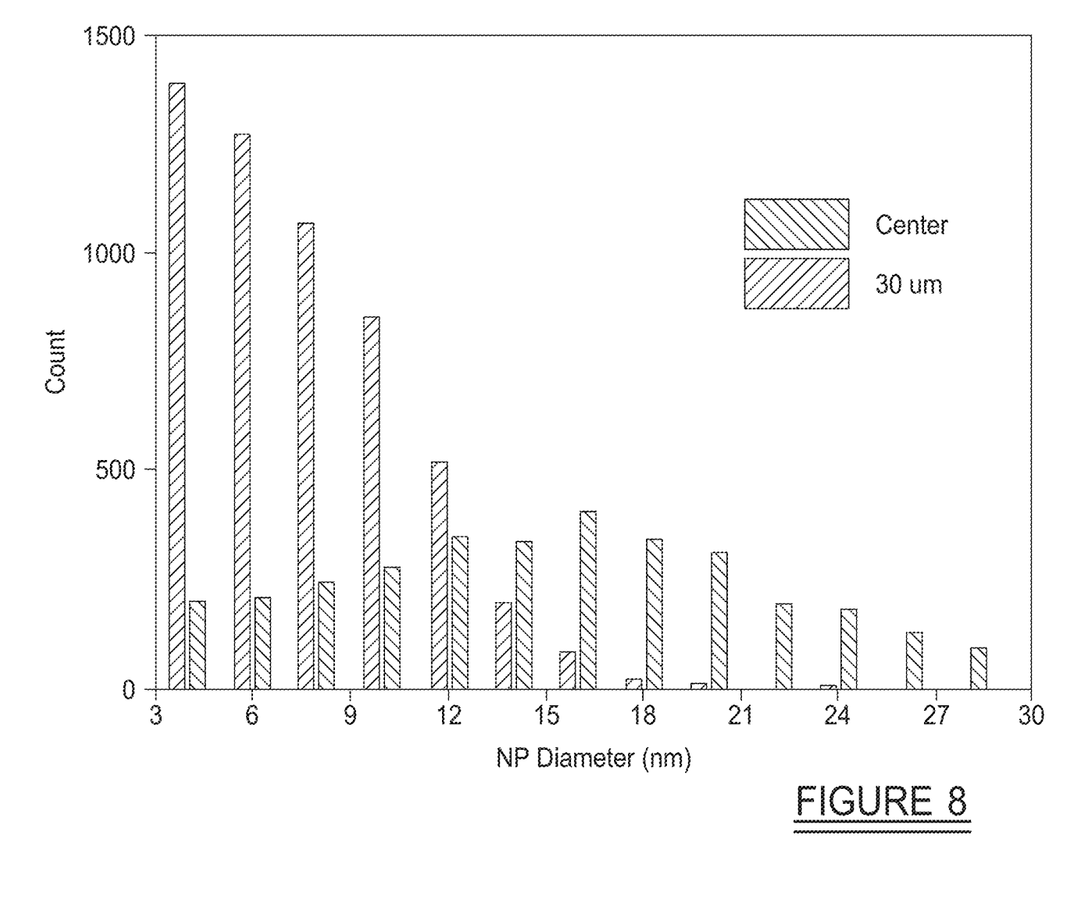
FIG. 8 is a graph showing nanoparticle size statistics of the two SEM images in FIG. 7; the region 30 um from the center is exposed to relatively lower fluence than the peak fluence in the center; particles with diameters of 16 nm were observed in the center and smaller particles were formed in the 30 um region.

FIG. 8 shows a graph illustrating how the count of nanoparticles, as well as the diameter of the nanoparticles, differs for the center region (at 0.3 $J/cm^2$ in FIG. 7) and for the region 30 um from the center (where beam fluence of 0.28 $J/cm^2$ was used).

Figure 9:
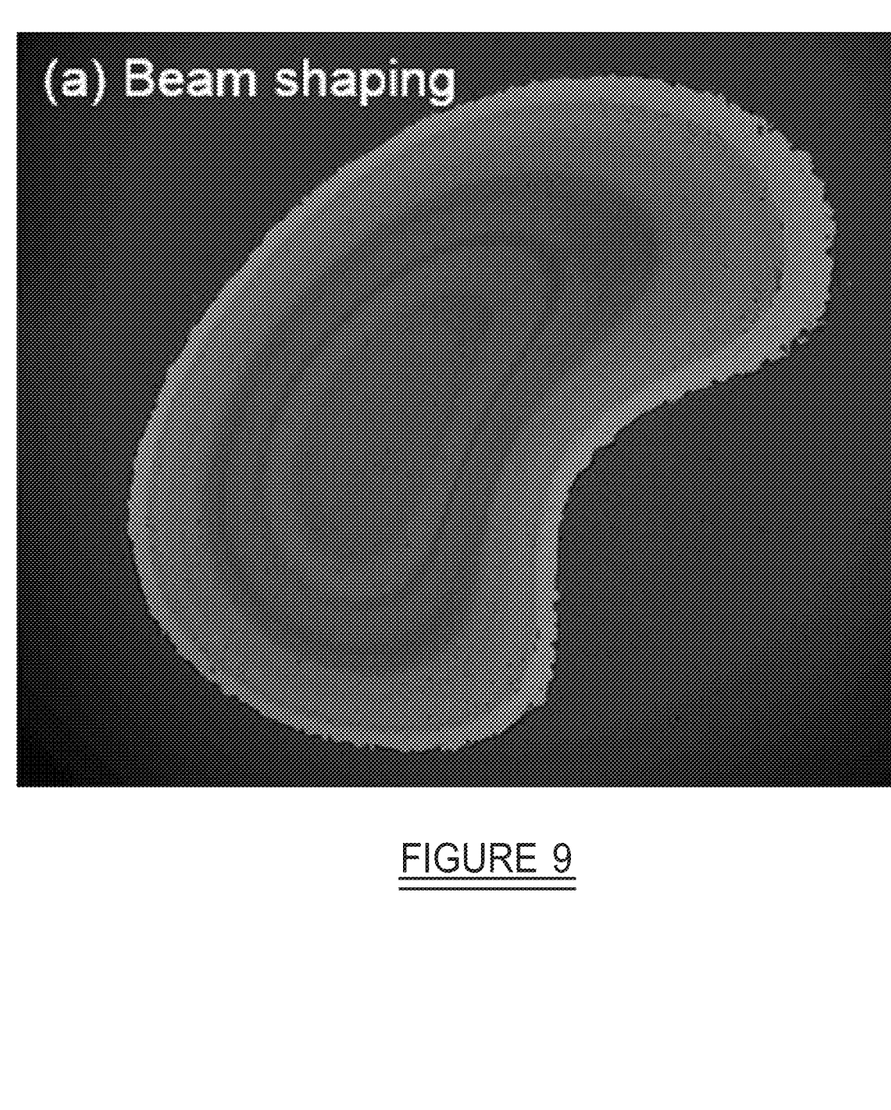
FIG. 9 illustrates a micrograph of a resulting morphology upon single pulse exposure of a shaped laser beam.

FIG. 9 illustrates a micrograph of a resulting morphology upon single pulse exposure of shaped beam. The shape (or fluence profile) of the shaped beam is directly projected to the resulting morphology of nanoparticles. This indicates that the nanoparticle formation is driven by local fluence.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for forming a graded index (GRIN) on a substrate, the method comprising:
    applying a metal layer to an upper surface of the substrate;
    applying a laser beam with ultrashort predetermined duration pulses to the metal layer under an ambient condition;
    controlling a fluence profile of the laser beam to ablate the metal layer to create a vaporized metal layer as a condensing cloud above the upper surface of the substrate, and wherein controlling the fluence profile includes controlling both a power and a spatial shape of the laser beam; and
    as the condensing cloud condenses and forms metal nanoparticles, further controlling the fluence profile of the laser beam to controllably modify a size of the metal nanoparticles and a distribution of the metal nanoparticles over different portions of the upper surface of the substrate, the metal nanoparticles being deposited back on the upper surface of the substrate; and forming a GRIN surface on the substrate, where the GRIN surface formed includes a spatially varying, controlled pattern of the metal nanoparticles on the substrate.

2. The method of claim 1, wherein the metal layer is fully ablated by the laser beam.

3. The method of claim 1, wherein the metal nanoparticles form the GRIN surface on a freeform optic.

4. The method of claim 1, wherein the predetermined duration of the pulses is in a nanosecond range.

5. The method of claim 1, wherein the predetermined duration of the pulses is in a picosecond range.

6. The method of claim 1, wherein the predetermined duration of the pulses is in a femtosecond range.

7. The method of claim 1, wherein the fluence profile is controlled within a range of 0.2 J/cm$^2$ to 0.4 J/cm$^2$.

8. The method of claim 1, wherein the applying a metal layer comprises applying a metal layer having a thickness of about 20 nm.

9. A method for forming a graded index (GRIN) on a substrate having a metal layer, the method comprising:
    placing a metal layer on an upper layer of a substrate;
    applying a laser beam generated by a laser with ultrashort duration pulses to the metal layer under an ambient condition, thus exposing the upper surface of the substrate;
    controlling a fluence profile of the laser beam to ablate the metal layer to create a vaporized metal layer cloud above the upper surface of the substrate, wherein the controlling the fluence profile includes controlling both a power of the laser beam and a shape of the laser beam, which creates the vaporized metal layer cloud with a controllably varying nanoparticle dimension and distribution over the metal layer on the substrate;
    further controlling the power of the laser beam and the shape of the laser beam to modify a size and a distribution of metal nanoparticles created from the vaporized metal layer as the vaporized metal layer condenses and forms metal nanoparticles over the metal layer; and
    using the metal nanoparticles to spatially pattern, in a predetermined manner, the upper surface of the substrate as the metal nanoparticles are deposited back on the upper surface of the substrate; and forming a GRIN surface on the upper surface of the substrate.

10. The method of claim 9, wherein the laser beam has pulses within a nanosecond range.

11. The method of claim 9, wherein the laser beam has pulses within a picosecond range.

12. The method of claim 9, wherein the laser beam has pulses within a femtosecond range.

13. The method of claim 9, wherein controlling the fluence profile of the laser beam comprises providing a laser fluence between 0.20 J/cm$^2$-0.40 J/cm$^2$.

14. The method of claim 9, wherein the laser fluence profile of the laser beam completely ablates ablate the metal layer.

15. The method of claim 9, wherein controlling the laser fluence profile of the laser beam comprises applying sufficient energy to fully ablate a 20 nm thick metal layer.

16. A system for forming a graded index (GRIN) on a substrate, the system comprising:
    a laser configured to generate a laser beam with ultrashort duration pulses and having a controlled fluence profile including a power and a spatial shape of the laser beam;
    an electronic controller configured to control the laser through control signals transmitted to the laser, the control signals controlling the fluence profile of the laser beam generated by the laser to:
        control both a power and a beam shape of the laser beam sufficient to initiate melting of a metal layer, under an ambient condition, to ablate the metal layer, and to create a vaporized metal layer as a cloud above an upper surface of the substrate; and to further control the fluence profile of the laser beam to modify a size and a distribution of metal nanoparticles created from the vaporized metal layer when the vaporized metal layer condenses and forms the metal nanoparticles, and such that the metal nanoparticles are deposited back on the upper surface of the substrate in a spatially controlled pattern to form a GRIN surface on the substrate.

17. The system of claim 16, wherein the laser is configured to generate pulses having a duration in a nanosecond range.

18. The system of claim 16, wherein the laser is configured to generate an output having a fluence of between about $0.1$ $J/cm^2$ — $1.0$ $J/cm^2$.

* * * * *